D. & E. MOORE.

Saw-Frames.

No. 5,674. Reissued Dec. 2, 1873.

WITNESSES:
P. C. Dieterich.
Harry C. Scott

Bissell & Moore Mf'g. Co.
per:
C. H. Watson & Co
ATTORNEYS.

AM. PHOTO-LITHOGRAPHIC Co. N.Y. (OSBORNE'S PROCESS)

UNITED STATES PATENT OFFICE.

DANIEL MOORE AND EDWIN MOORE, OF BROOKLYN, E. D., NEW YORK, ASSIGNORS TO THE BISSELL AND MOORE MANUFACTURING COMPANY, OF NEW YORK CITY.

IMPROVEMENT IN SAW-FRAMES.

Specification forming part of Letters Patent No. 94,500, dated September 7, 1869; reissue No. 4,276, dated February 21, 1871; reissue No. 5,674, dated December 2, 1873; application filed November 17, 1873.

*To all whom it may concern:*

Be it known that DANIEL MOORE and EDWIN MOORE, of the city of Brooklyn, E. D., county of Kings and State of New York, have invented certain new and useful Improvements in Saw-Frames.

This invention is for the combination of a brace, frame, saw, and tightener, as will be hereinafter described; and the following is a full, clear, and exact description thereof, which will enable others skilled in the art to which it appertains to make and use the same, reference being had to the accompanying drawings, with letters of reference marked thereon, forming a part of this specification, in which—

Figure 1:
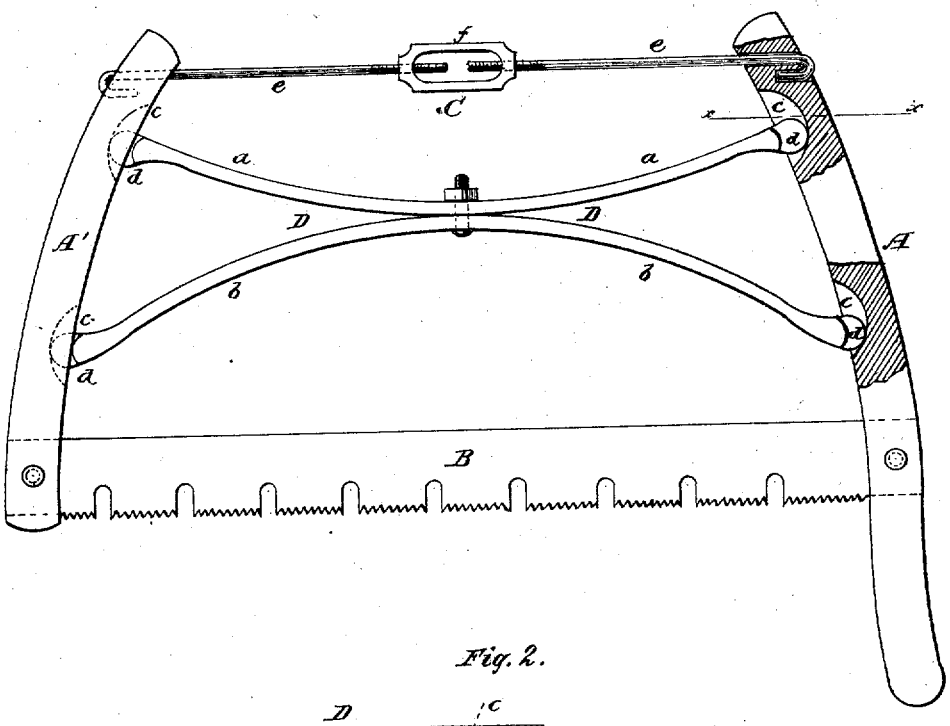
Figure 2:
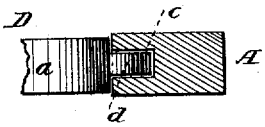

Figure 1 represents a side elevation partly in section, and Fig. 2 represents a section of one of the joints.

A represents the handle portion of the saw-frame. A′ represents the opposite portion of the frame; B, the saw; and *e*, the tightener for drawing the upper ends of the saw-frame together. This tightener is shown as made of rods with looped ends passing into mortises in the upper ends of the frames A A′, the rods having right-and-left-hand screw-threads on them, taking the shackle *f*. The thrust-brace is made with ends, as seen at *d*, constructed to fit corresponding mortises or recesses *c* in the faces or inner edges of the frame sides A A′. This thrust-brace D is shown as being formed of arcs of circles *a b*, and the straining of the saw is effected by forcing the stretcher *b* into a more nearly straight form, and thereby increasing the distance between the joints *d* of the stretcher *b*. The counter stretcher or brace *a* is shown as attached near the middle to the stretcher *b*, and the ends enter the mortises or recesses in the frames A A′. These stretchers *a* and *b* form arcs of circles, the convex sides being placed together; hence, when the tightener *e* draws the ends of *a* toward each other and make the same the arc of a smaller circle, the stretcher *b* will be forced into a more nearly straight form straining the saw by pressing against the inner edges of the frames A A′.

A saw-frame with a single stretcher is not claimed; neither a thrust-brace and diagonal bar; nor a pair of tension-braces and a thrust-brace; but,

Having thus fully described the invention, what is claimed, and desired to be secured by Letters Patent, is—

The frame sides A A′, a saw, B, and a tightener, *e*, in combination with the thrust-brace D, having the four points of bearing in the frames A A′, between the tightener and saw, substantially as and for the purpose specified.

Dated this 15th day of November, 1873.

BISSELL & MOORE MANUFACTURING COMPANY,
Per GEO. H. BISSELL, *President.*
EUGENE BISSELL, *Secretary.*

Witnesses:
C. G. LINCOLN.
GEO. STURTEVANT.